UNITED STATES PATENT OFFICE.

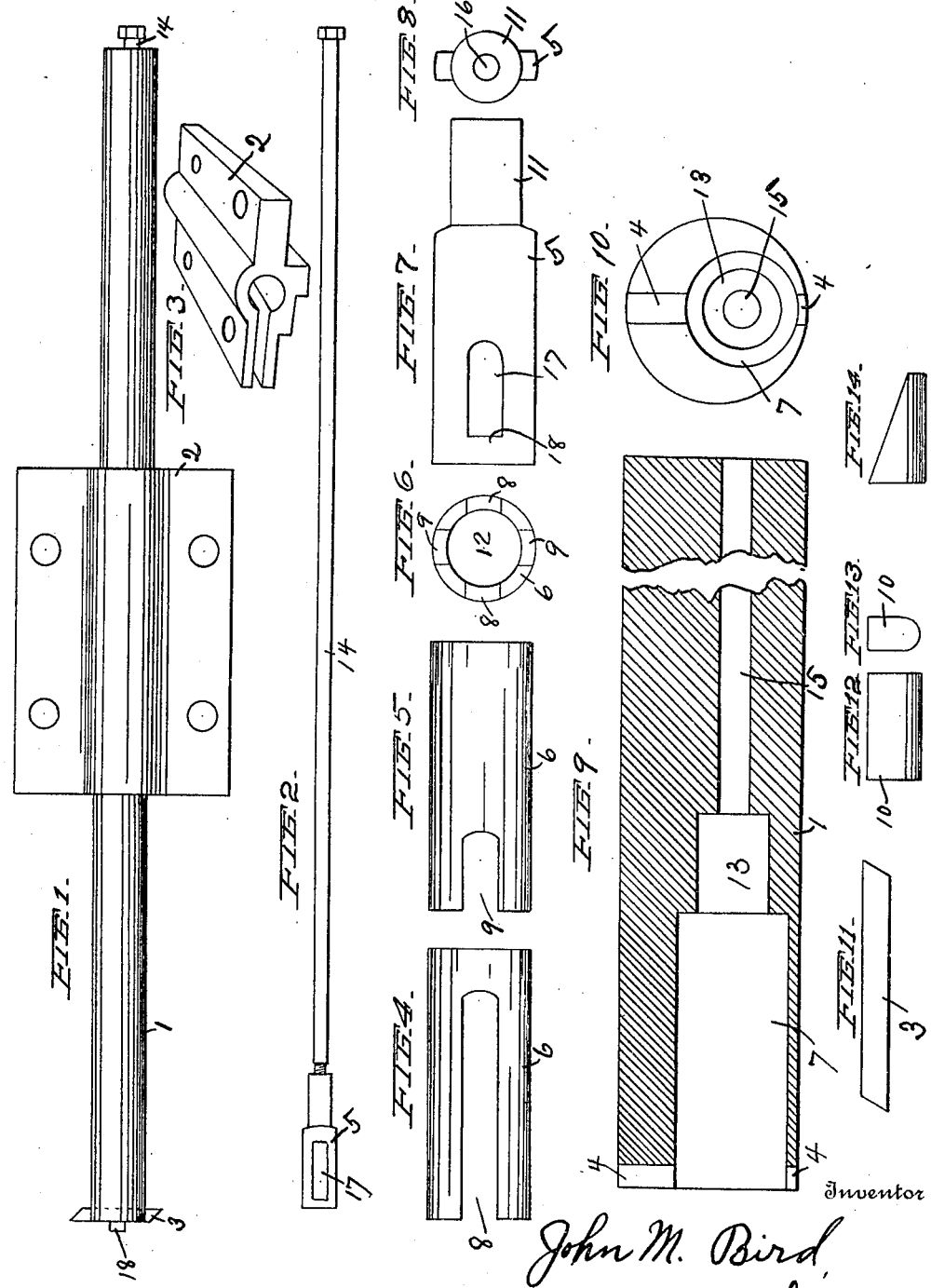

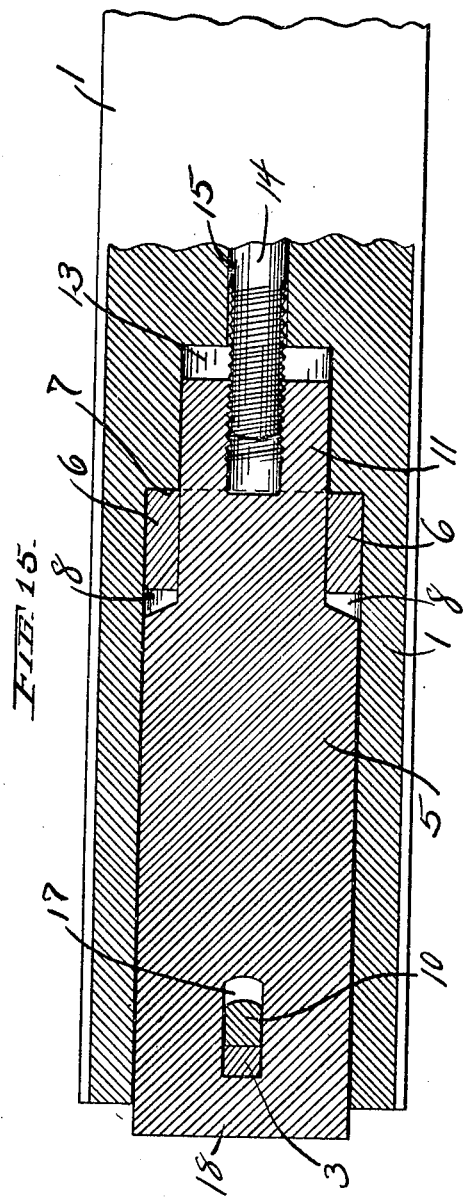

JOHN M. BIRD, OF FORT WORTH, TEXAS.

BORING-BAR.

1,291,736. Specification of Letters Patent. Patented Jan. 21, 1919.

Application filed July 9, 1918. Serial No. 244,113.

*To all whom it may concern:*

Be it known that I, JOHN M. BIRD, a citizen of the United States of America, residing at Fort Worth, in the county of Tarrant and State of Texas, have invented certain new and useful Improvements in Boring-Bars, of which the following is a specification.

My invention relates to boring bars, and the object is to provide a boring bar which will be simple in construction and operation and which will hold the tool rigidly in place during operation and which will prevent the cutting tool from becoming loose in its socket or holder. Another object is to provide a boring bar by which the cutting will be done on the inside or outside of the work equally as well. Another advantage is in cases where the lathe will not swing over the carriage, the improved boring bar will turn off or cut on the outside, and, so far as I know, no other boring bar will do such work in such cases. Other objects and advantages will be fully explained in the following description and the invention will be more particularly pointed out in the claims.

Reference is had to the accompanying drawings which form a part of this application.

Figure 1 is a plan view of the boring bar mounted in a holder or stock. Fig. 2 is a side view of the tool holder and the rod for adjusting the tool holder. Fig. 3 is a perspective view of the bar holder or stock. Fig. 4 is a side elevation of the chuck and guide, showing the slot for the tool holder. Fig. 5 is a side elevation of the same, showing the slot for the wedge, being a view of the chuck turned one quarter over. Fig. 6 is an end view of the same. Fig. 7 is a side elevation of the tool or blade holder. Fig. 8 is an end view, the inner end, of the blade or tool holder. Fig. 9 is a broken longitudinal section of the bar, showing the sockets for the several parts. Fig. 10 is an end elevation of the operating end of the bar. Fig. 11 is a side elevation of a tool or cutting blade. Fig. 12 is a side elevation of a wedge. Fig. 13 is an end view of the same. Fig. 14 is a side elevation of a wedge which is a variation of the wedge shown in Figs. 12 and 13. Fig. 15 is a broken longitudinal section, showing the operating parts assembled.

Similar characters of reference are used to indicate the same parts throughout the several views.

The boring bar 1 is mounted in a stock 2 which is to be bolted to a slide rest (not shown). The blade or cutting tool 3 is jointly held by the bar 1 in a transverse slot 4 and in a holder 5. A chuck and guide 6 is provided for the holder 5. The chuck 6 fits in a socket 7 in the boring bar 1 and is provided with a long slot 8 for the holder 5 and a short slot 9 for the wedge 10. The holder 5 is placed in the slot 8 with the shank 11 projecting through the opening 12 through the inner end of the chuck 6 and into the socket 13 in the boring bar 1. An adjusting rod 14 is run through an opening 15 in the boring bar 1 and screwed into the shank 11 of the holder 5, the shank 11 having a threaded opening 16 to receive the rod 14. If it becomes necessary to vary the angle of the cutting tool 3, a beveled wedge, such as shown in Fig. 14, may be used.

The manner of assembling the boring bar parts is as follows:—The chuck 6 is placed in the socket 7 and the holder 5 is placed in the slot 8 in the chuck with the shank 11 projecting through the opening 12. Before the holder 5 is shoved into its operative position, the blade or cutting tool 3 is placed in the slot 17 and wedged therein by a wedge 10 and when the holder 5 is shoved into its place the wedge 10 will occupy the slot 9 of the chuck 6. The shank 11 will project through the opening 12 into socket 13. The rod 14 is screwed into the opening 16 in the shank 11. The holder 5 and the wedge 3 can then be tightened in the bar by screwing the bar 14 and tightening the same against the back end of the bar 1. The tool 3 will be pressed into and tightened in the slot 9 by the holder 5 and the blade or cutting tool, will be clamped between the wedge 10 (which is clamped against the bottom wall of slot 9) and the part 18 of the holder 5 and will also be clamped in the slot 4 of the boring bar and the holder 5 is held rigid by the rod 14. The holder and tool can be removed by unscrewing the rod 14.

What I claim, is,—

1. A boring bar having a longitudinal opening and a chuck socket and a shank socket and a transverse slot in the work end thereof, a chuck and guide mounted in said chuck socket and provided with slots in the sides thereof, a tool holder mounted in said chuck and occupying a pair of slots therein and having a shank occupying said shank socket, a cutting tool mounted in said holder and in said transverse slot, and means for tightening said holder on said cutting tool and tightening said cutting tool in said transverse slot.

2. A boring bar having a longitudinal opening therethrough and a chuck socket and a shank socket and a transverse slot in the work end thereof, a chuck and guide mounted in said chuck socket and provided with relatively long slots and relatively short slots, a tool holder mounted in said chuck and occupying said long slots and having a shank projecting in said shank socket, a cutting tool mounted in said holder and in said transverse slot, a wedge for said tool mounted in said holder and occupying said short slots, and means for tightening said wedge in said chuck and tightening said holder on said tool for tightening said tool in said transverse slot and on said wedge.

3. A boring bar having a longitudinal opening therethrough and a chuck socket and a shank socket and a transverse slot in the work end, a chuck and guide mounted in said chuck socket and provided with relatively long slots and relatively short slots in the sides thereof, a holder mounted in said chuck and in said long slots and provided with a shank projecting into said shank socket, a cutting tool mounted in said holder and in said transverse slot, a wedge for said tool mounted in said holder and in said short slots, and a rod for tightening said holder on said tool and tightening said tool in said transverse slot and tightening said tool against said wedge and said wedge in said short slots.

4. A boring bar, a chuck and guide having long and short slots therein mounted in said boring bar, a holder mounted in said chuck and in said long slots, said bar having a transverse slot in the work end, a cutting tool mounted in said holder and in said transverse slot, a wedge for said tool mounted in said holder and in said short slots, and means for tightening said tool in said transverse slot and said wedge and holder in said chuck and said chuck in said boring bar.

In testimony whereof, I set my hand, this 6th day of July, 1918.

JOHN M. BIRD.

Copies of this patent may be obtained for five cents each, by addressing the "Commissioner of Patents, Washington, D. C."